United States Patent [19]

Viskochil et al.

[11] Patent Number: 5,602,700
[45] Date of Patent: Feb. 11, 1997

[54] AERODYNAMIC ACTUATOR-FILTER LATCH FOR HARD DISK DRIVE

[75] Inventors: Stephen Viskochil, Los Gatos; Jonathan C. Hofland, San Jose, both of Calif.

[73] Assignee: Quantum Corporation, Milpitas, Calif.

[21] Appl. No.: 421,593

[22] Filed: Apr. 12, 1995

[51] Int. Cl.⁶ .............................. G11B 5/54; G11B 21/22
[52] U.S. Cl. ........................................ 360/105; 360/97.02
[58] Field of Search ................................... 360/105, 106, 360/97.02, 97.03, 97.01

[56] References Cited

U.S. PATENT DOCUMENTS

| | | | |
|---|---|---|---|
| 3,839,734 | 10/1974 | George et al. | 360/102 |
| 4,369,475 | 1/1983 | Ho et al. | 360/97 |
| 4,538,193 | 8/1985 | Dimmick et al. | 360/137 |
| 4,647,997 | 3/1987 | Westwood | 360/105 |
| 4,692,829 | 9/1987 | Campbell | 360/105 |
| 5,036,416 | 7/1991 | Mastache | 360/105 |
| 5,041,934 | 8/1991 | Stefansky | 360/106 |
| 5,043,834 | 8/1991 | Kubo et al. | 360/105 |
| 5,319,511 | 6/1994 | Lin | 360/105 |
| 5,329,412 | 7/1994 | Stefansky | 360/105 X |
| 5,455,728 | 10/1995 | Edwards et al. | 360/105 |

FOREIGN PATENT DOCUMENTS 62-298076  12/1987  Japan.

*Primary Examiner*—Stuart S. Levy
*Assistant Examiner*—William R. Korzuch
*Attorney, Agent, or Firm*—David B. Harrison; John C. Chen

[57] ABSTRACT

An aerodynamic actuator filter-latch for releasably locking a rotary voice coil actuator within a hard disk drive includes a shaft and a rotating latch structure on the shaft. The latch structure includes an airvane portion extending across a rotating disk adjacent one of the major surfaces thereof, a central portion including an air filter for removing minute particulate contaminants from air within the enclosed head and disk assembly, the air filter being located adjacent to a periphery of the disk, and an actuator latch portion extending toward the rotary voice coil actuator. The aerodynamic actuator filter-latch also includes a bias force mechanism for biasing the latch structure toward an actuator latch position in the absence of airflow. Rotation of the data storage disk causes the latch structure to rotate to a release position while some resultant airflow through the air filter removes contaminants.

11 Claims, 4 Drawing Sheets

AERODYNAMIC ACTUATOR-FILTER LATCH FOR HARD DISK DRIVE

SUMMARY OF THE INVENTION

The present invention relates to a combination of two functional features within a hard disk drive. More particularly, the present invention relates to an aerodynamic actuator latch including an air filter as an integral part thereof for simultaneously responding to airflow generated by disk rotation by releasing a data transducer actuator and by filtering contaminating particles from the airflow.

BACKGROUND OF THE INVENTION

Flying head or "Winchester" disk drives include a head-disk interface which is separated by a very thin film of air molecules. As data storage densities become higher per unit surface area, flying heights of heads above disks become lower and lower. In contemporary disk drive designs it is not uncommon to specify head to disk surface separation in a range of 1.5 to 3 microinches. Very minute particles within the head-disk chamber and having sizes greater than the flying height may destructively interfere with the head and/or storage media. Considerable attention is therefore given to removing any free particles from circulation within the enclosed head and disk assembly by filtration techniques. Air filters for inclusion within head and disk assemblies are well known in the prior art. An early example is found in U.S. Pat. No. 3,839,734. A later example is found in U.S. Pat. No. 4,369,475.

In terms of environmental particulate filtering within the very clean interior of the head and disk assembly, in prior disk drive designs, air filters were supported within and by specially provided structural features cast into the deep-dish base casting. Such cast-in filter-supporting features could be provided only by separate structural support elements which have to be added to flat, sheet metal bases, at greater expense and with added assembly time and complexity.

Since disk drive head and disk mechanisms involve round disks which are usually contained in rectangular packages or "form factors", it is not uncommon to find that one corner of the head-disk enclosure is suitably adapted for, and equipped with, an air filter. One example of this kind of arrangement is found in commonly assigned U.S. Pat. No. 4,647,997 to Westwood entitled: "Aerodynamic Latch for Disk File Actuator", the disclosure thereof being incorporated herein by reference. While the gist of this prior patent is directed to an aerodynamic latch structure for use within a 3.5 inch form factor disk drive, filter element 86 is shown placed in an upper corner of the head-disk enclosure at an opposite side of a location of the voice coil motor, and aerodynamic latch mechanism. As shown by arrows in FIG. 1 of this patent, airflow generated by disk rotation enters one end of the filter 86 and exits another end of the filter. At the same time, airflow generated from disk rotation is employed to actuate an aerodynamic actuator latch structure 46 and thereby release a rotary voice coil actuator. In the example provided by this prior patent, a base structure was formed as a "deep dish" casting, and structural features in the base were provided to aid positioning the filter element 86. Other structural features, including a vertical pin 50 press-fit into the base casting, were used e.g. to support the aerodynamic latch structure 42.

In addition to U.S. Pat. No. 4,647,997 noted above, the assignee of the present invention has pioneered the concept of an aerodynamically released actuator latch for hard disk drives. By way of example, the reader's attention is directed to commonly assigned U.S. Pat. No. 4,538,193 for "Aerodynamically Released Safety Latch for Data Transducer Assembly in Rotating Rigid Disk Data Storage Device"; U.S. Pat. No. 4,692,829 for "Magnetically Biased Aerodynamically Released Integral Safety Latch for Rigid Disk Drive"; and commonly assigned U.S. Pat. No. 5,319,511 for "Aerodynamic Actuator Latch with Magnetic Return Spring for Hard Disk Drive"; the disclosures thereof also being incorporated herein by reference.

One of the above referenced patents, U.S. Pat. No. 4,538,193, describes an embodiment of aerodynamic actuator latch including an airvane disposed beneath one of a stack of rotating disks and an air scoop portion which was located in a central portion of the latch in a vertical space between an airvane journal post and peripheral edges of the disk stack. However, in this prior approach, a separate filter element was provided in the enclosed head/disk assembly, and the air scoop was impermeable to airflow (i.e. it was not a filter element).

While the prior approaches described above worked well for their intended purposes, hitherto unsolved problems have remained. One problem has been associated with hard disk drives employing a single 3.5 inch diameter data storage disk. One prior solution proposed for this problem was to add a second, airflow generator disk, as described in the above-referenced, commonly assigned U.S. Pat. No. 4,647,997. Another proposed solution was to increase disk rotational speed to well above nominal rotational velocity during initial spin-up, in order to generate sufficient airflow to release the actuator latch, as taught in U.S. Pat. No. 5,043,834 et al. to Kubo entitled: "Actuator Locking System of Disk Unit". One other proposed solution was to add airflow generation fins to the disk spindle hub, as described in commonly assigned U.S. patent application Ser. No. 07/839,870 filed on Feb. 21, 1992 for "Airflow Generator Spindle Hub for Aerodynamically Released Disk Drive Actuator Latch".

Thus, a hitherto unsolved need has remained for air filtration support structure integrated into existing components of an aerodynamic actuator latch structure, thereby to combine the functions of air filtration and actuator latching in a cooperative, synergistic manner and to reduce overall disk drive components count and drive complexity.

SUMMARY OF THE INVENTION WITH OBJECTS

A general object of the present invention is to provide a simplified and unified aerodynamic air filter/latch structure for a hard disk drive in a manner overcoming limitations and drawbacks of the prior art.

Another object of the present invention is to use airflow generated by rotation of miniature magnetic data storage hard disks to release an actuator latch while at the same time using the actuator latch structure to guide airflow through an air filter element supported by, and acting as a functional part of, the actuator latch structure itself.

A further object of the present invention is to combine an airflow filter structure as an integral part of an aerodynamic actuator latch structure, in order to realize synergy from the combination and to reduce parts count within a cost-reduced, miniaturized hard disk drive.

One more object of the present invention is to add an airflow filter to an aerodynamic actuator latch in a manner improving performance of the latch while providing improved air filtration within an enclosed hard disk drive mechanism.

Yet another object of the present invention is to realize a cost-reduced head/disk mechanism for a hard disk drive including sheet metal base and cover which combines separate air filter and aerodynamic actuator latch structures into a single structure, with resultant improved performance of each structure, and resultant cost savings due to reduction of parts otherwise needed for separate structures.

In one aspect of the present invention an aerodynamic actuator filter-latch is provided for an enclosed head and disk assembly of a hard disk drive. The drive includes a base and a cover, at least one rotating data storage disk journalled to the base, and a rotary voice coil actuator rotatably attached to the base for positioning a data transducer head at data storage locations defined on major surfaces of the rotating disk. In this aspect of the invention, the aerodynamic actuator filter-latch includes a shaft and a rotating latch structure on the shaft. The latch structure includes an airvane portion extending across the disk adjacent one of the major surfaces thereof, a central portion including an air filter for removing minute particulate contaminants from air within the enclosed head and disk assembly, the air filter being located adjacent to a periphery of the disk, and an actuator latch portion extending toward the rotary voice coil actuator. The aerodynamic actuator filter-latch also includes a bias force mechanism for biasing the latch structure toward an actuator latch position in the absence of airflow. Rotation of the data storage disk causes the latch structure to rotate to an actuator release position and results in airflow through the air filter in order to remove contaminants from the enclosed head and disk assembly.

As one facet of this aspect of the invention, the data storage disk comprises a 3.5 inch diameter data storage disk.

As another facet of this aspect of the invention, the base essentially comprises a flat sheet metal plate, and wherein the cover comprises a formed sheet metal cover defining a space occupied by the enclosed head and disk assembly.

As yet another facet of this aspect of the invention, the aerodynamic actuator-filter shaft extends upwardly from the base plate at a location spaced away from a periphery of the disk, and the central portion is located between the shaft and the periphery of the disk.

As one more facet of this aspect of the invention, the sheet metal cover is formed to concentrate airflow from the disk toward the central portion, thereby enhancing airflow impinging upon the central portion and passing through the air filter.

As yet another facet of this aspect of the invention, the rotary voice coil actuator includes a permanent magnet structure mounted to the base and defines a magnetic gap. An actuator coil is disposed in the magnetic gap. The bias force providing mechanism includes an arm extending from the latch structure and has a ferromagnetic body rotatably entering the magnetic field which thereby biases the latch structure toward an actuator latch position in absence of airflow from disk rotation.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
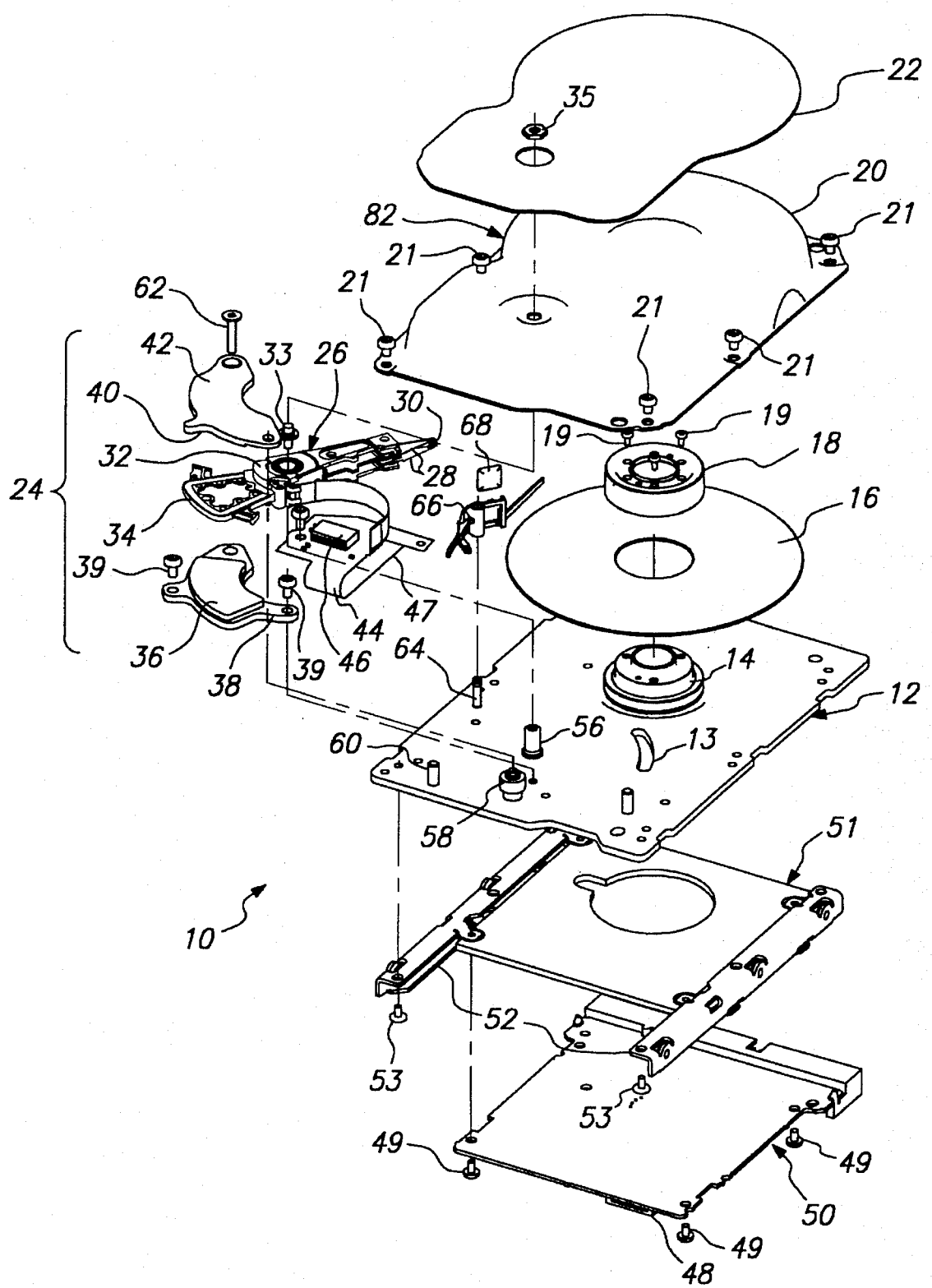
FIG. 1 is an exploded assembly drawing of a miniature hard disk drive incorporating an aerodynamic actuator-filter latch for a hard disk drive in accordance with principles of the present invention.
Figure 3:
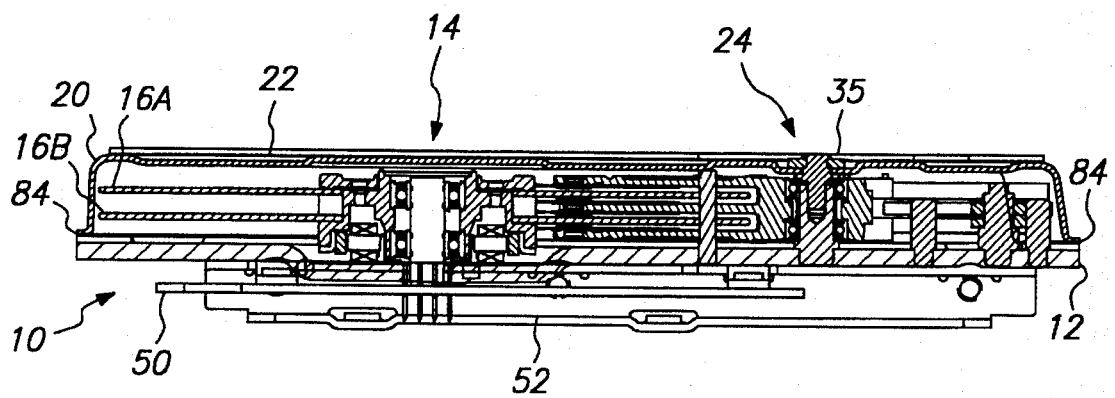
FIG. 3 is a diagrammatic side view in elevation and longitudinal section of the FIG. 2 hard disk drive.
Figure 4:
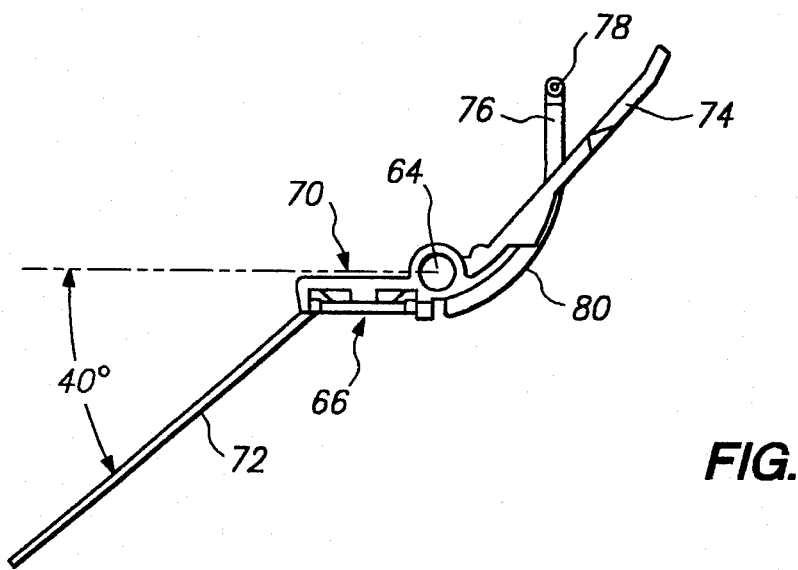
FIG. 4 is an enlarged top plan view of the aerodynamic actuator-filter latch of the FIG. 1 hard disk drive.

With reference to FIG. 1, a hard disk drive 10 includes a substantially flat base 12, a spindle motor- disk hub assembly 14, at least one data storage disk 16, a disk clamp 18 held by screws 19 to the hub assembly 14 for clamping the data storage disk in place, and a deep-drawn sheet metal cover 20, also held in place over the base 12 by screws 21. A gasket 84, shown in FIG. 3, is placed between the base and a peripheral flange of the sheet metal cover 20. A sound-deadening laminate plate 22 is preferably affixed over the cover 20 (see FIG. 3) to reduce audible sound energy otherwise emanating from the operating disk drive 10. A curved access slot 13 formed in the base plate 12 provides for access by a push-pin servo writer during the disk drive assembly/manufacturing/formatting process at the factory. Most preferably, although not necessarily, the hard disk drive 10 employs embedded sector servo technology, explained by way of example in commonly assigned U.S. Pat. No. 5,255,136 to Machado et al., entitled: "High Capacity Submicro-Winchester Fixed Disk Drive", the disclosure thereof being incorporated herein by reference.

While in the preferred example of FIG. 1 the flat base plate 12 is preferably formed of sheet metal, those skilled in the art will appreciate that embodiments of the present invention may be provided for use with disk drives employing bases formed by casting, stamping, extrusion or any other suitable base fabrication method. While the cover is preferably formed as a deep-drawn sheet metal component, it too may be formed by any suitable method, such as casting, stamping, extrusion, etc.

FIG. 3 provides an example of a two disk embodiment of the present invention, wherein disks 16A and 16B are stacked in a spaced-apart relationship upon the disk spindle hub 14. Also, FIG. 3 shows in outline form some of the components comprising a DC brushless spindle motor within the hub assembly 14 which, while required to rotate the disks 16A and 16B, is not a part of the present invention and is not described or shown in any further detail.

The disk drive 10 also includes a rotary voice coil actuator assembly 24. The actuator assembly 24 includes an E-block rotor 26 including head arms or tines which support load beams 28. The load beams 28 act as springs as well as supports for head-gimbal assemblies including a magnetic transducer element (head transducers) 30, there being one head transducer 30 for each major surface of the storage disk 16 in the hard disk drive 10. The actuator assembly 24 also includes a bearing assembly 32 which includes e.g. two ball bearings and a wavy spring and spacer which act with an actuator shaft 56 to mount the actuator assembly 24 rotationally to the base plate 12. A trapezoidally shaped voice coil 34 is plastic-molded to the molded E-block assembly. A fixed permanent magnet assembly includes a lower permanent magnet 36 which is affixed to a lower magnetic flux return plate 38. An upper permanent magnet 40 may optionally be affixed similarly, e.g. by a suitable adhesive, to an upper magnet flux return plate 42 in order to provide increased magnetic flux in the gap between the two plates and magnets, thereby increasing responsiveness of the actuator to driving currents to reduce track access times. The lower plate 38 and the upper plate 42 are formed of a suitable ferromagnetic material. The lower plate 38 is secured to the base plate 12 by screws 39. Also, the upper plate 42 is held above the lower plate by three posts 58, 60 and 62. Posts 58 and 62 include elastomeric crash stops which effectively limit the angle of rotational displacement of the rotary actuator 24 to the active storage and landing zone areas of the data storage disk.

A flexible circuit 44 carries conductive traces to the heads 30 and to the rotary voice coil 34. The flex circuit 44 also carries and connects a read preamplifier, write driver, head select integrated circuit 46 which is placed inside of the head and disk assembly in order to be close to the heads 30 in order to reduce pickup of extraneous noise. A flex circuit extension 47 provides for electrical circuit connections to a connector 48 mounted on a main printed circuit board 50. The circuit board 50 is positioned in a space between two angled side rails 52 which are attached to the flat base plate 12 by mounting screws 53. An insulating film sheet 51 is interposed between the printed circuit board 50 and the sheet metal base plate 12, to reduce acoustic noise and to prevent exposed circuit traces of the printed circuit board to become shorted out to the base 12. A central cutout in the film sheet 12 is provided for the spindle motor assembly 14 and enables DC brushless spindle motor connecting pins to contact the circuit board 50 directly. Screws 49 enable the circuit board 50 to be mounted to threaded bosses extending from the angled side rails 52. The printed circuit board 50 carries all of the electronics circuitry of the disk drive 10, details of the circuitry not being described as not directly pertinent to the present invention. The foregoing description is provided by way of background to describe an intended environment for embodiments of the present invention.

Figure 2:
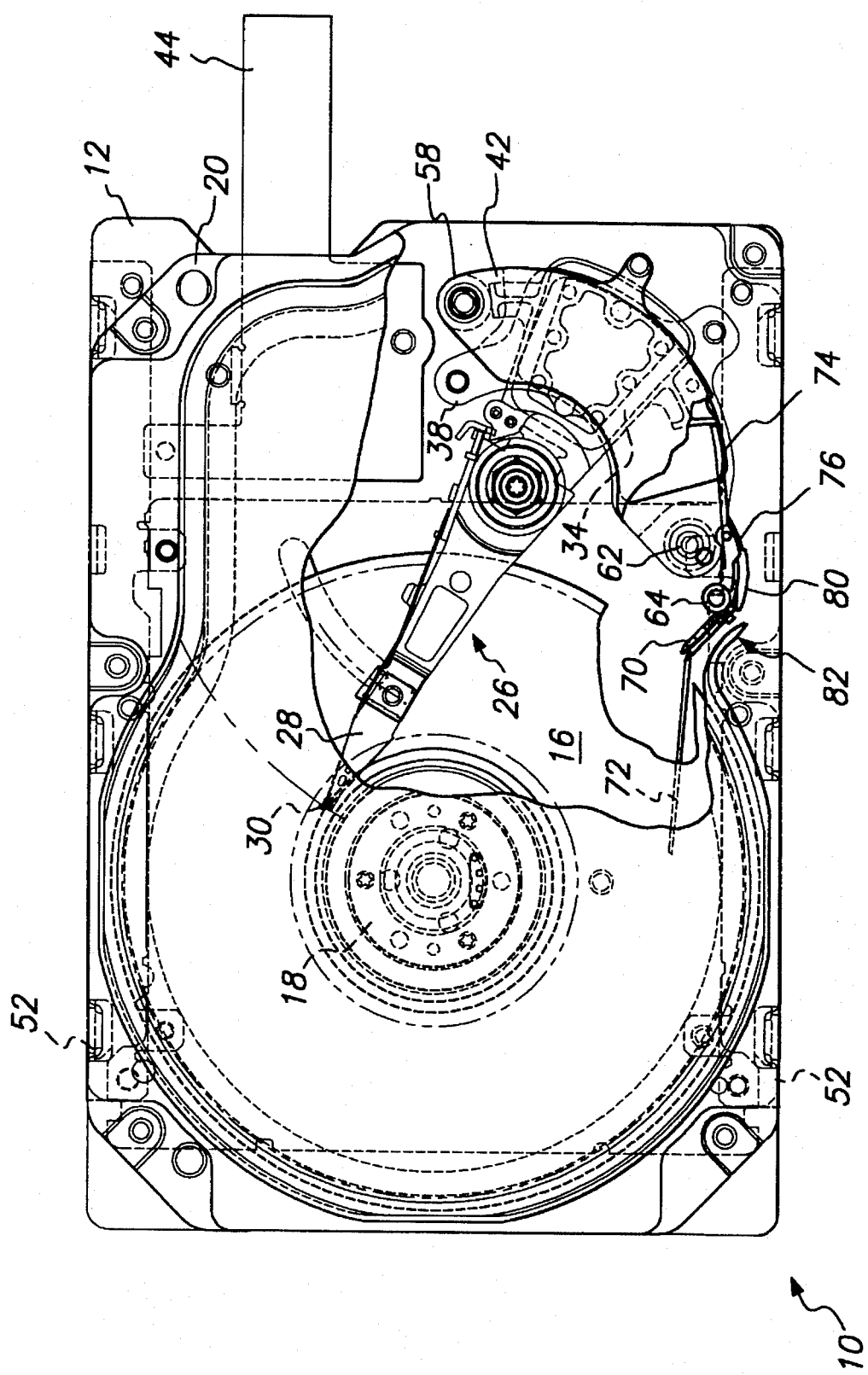
FIG. 2 is a diagrammatic top plan "x-ray" drawing of the FIG. 1 hard disk drive upon assembly thereof.
Figure 5:
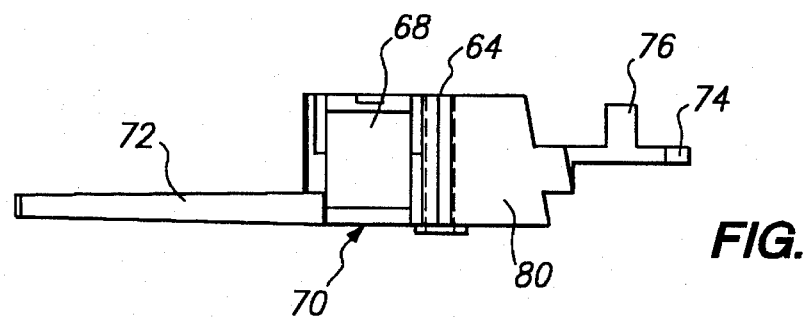
FIG. 5 is a side view in elevation of the FIG. 4 aerodynamic actuator-filter latch.

Turning now to structural aspects of an embodiment of the present invention, an actuator-filter journal shaft 64 is press-fit into the sheet metal base 12 at a distance closely spaced away from the peripheral edge of the data storage disk 16, as perhaps best shown in the FIG. 2 plan view. Rotatably positioned on the shaft 64 is a molded actuator-filter latch assembly 66. A particulate filter pad 68 is disposed in a central portion 70 of the molded actuator-filter latch assembly 66, as shown in FIG. 5. An airvane portion 72 extends outwardly from the central portion 70 of the assembly 66 and intersects airflow generated in the present example at the underside of the disk 16 during disk rotation.

At a rest/latched position as shown in FIG. 2, the airvane portion also acts as an air guide for guiding airflow gathered from the rotating disk 16 toward the central portion 70 and the filter 68, so that air flow is directed not only against the airvane portion 72, it is also focused and concentrated toward and upon the central portion 70. Since the central portion 70 is positioned between the shaft 64 and the periphery of the disk 16, the central portion 70 also acts as part of the air latch mechanism, in that airflow directed toward the filter 68 imparts a deflection force thereto even as the air is passing through the filter media, so that the central portion 70, in combination with the vane portion 72 is deflected by the flow and rotated to a position at which a latch arm portion 74 is moved away from the rotary voice coil 34, thereby releasing the rotary actuator assembly 24 from a head parking position at a radially innermost location on the disk 16.

Once released, the rotary actuator assembly 24 is enabled to rotate through its range of limited angular displacement relative to the disk surface, thereby to position and maintain the heads 30 at data storage/retrieval locations defined on the surfaces of the disk 16. The actuator assembly 24 may be provided with an electronic return spring exploiting energy stored in the rotating disk spindle assembly and converted to electricity by the spindle motor in order to return the actuator structure 24 to the landing zone/latched position, in the event that power ceases to be supplied to operate the disk drive 10. The electronic return spring is a conventional feature and will not be further described.

A bias arm portion 76 extends from a central region of the actuator-filter latch 66, and encapsulates/holds a ferromagnetic body 78. The bias arm portion 76 is curved, so that after the latch 66 is installed upon its shaft 64 within the disk drive 10, the bias arm portion curves towards the magnetic gap defined by the permanent magnet structure of the rotary actuator 24. In this manner, the bias arm portion 76 provides a bias spring force to the actuator-filter latch 66 in the same manner as described in commonly assigned U.S. Pat. No. 5,319,511, described above, and is a presently preferred biasing method. Other suitable, but presently less preferred, biasing methods include providing a bias spring, such as the helical clock spring illustrated in commonly assigned U.S. Pat. No. 4,647,997 described above, or providing two permanents in repulsion, as described in commonly assigned U.S. Pat. No. 4,692,829 described above.

As formed, the actuator-filter latch structure 66 also includes a curved counter-balancing segment 80 which extends from the pivot shaft 64 on an opposite side of the central portion 70, curving in a direction toward the latch arm segment 74 and the bias arm segment 76. The curved segment 80 not only counterbalances the structure 66 about the shaft 64, it also serves to reduce to as great an extent as practical an otherwise available airflow passage between the structure 66 and the cover 20. By reducing an alternative airflow passage around the structure 66 by the counter-balancing segment 80, most of the airflow is forced through the filter 68, thereby increasing the filtering action, as well as the improving the operation of the latch function of the structure 66.

As shown in FIGS. 1 and 2, the deep dish sheet metal cover 20 includes an inwardly curved region 82 at the vicinity of the central portion 70 of the actuator-filter latch structure 66, such that airflow is constricted and focused toward the central portion 70 and thence, is further guided toward, and through the filter media 68.

Figure 6:
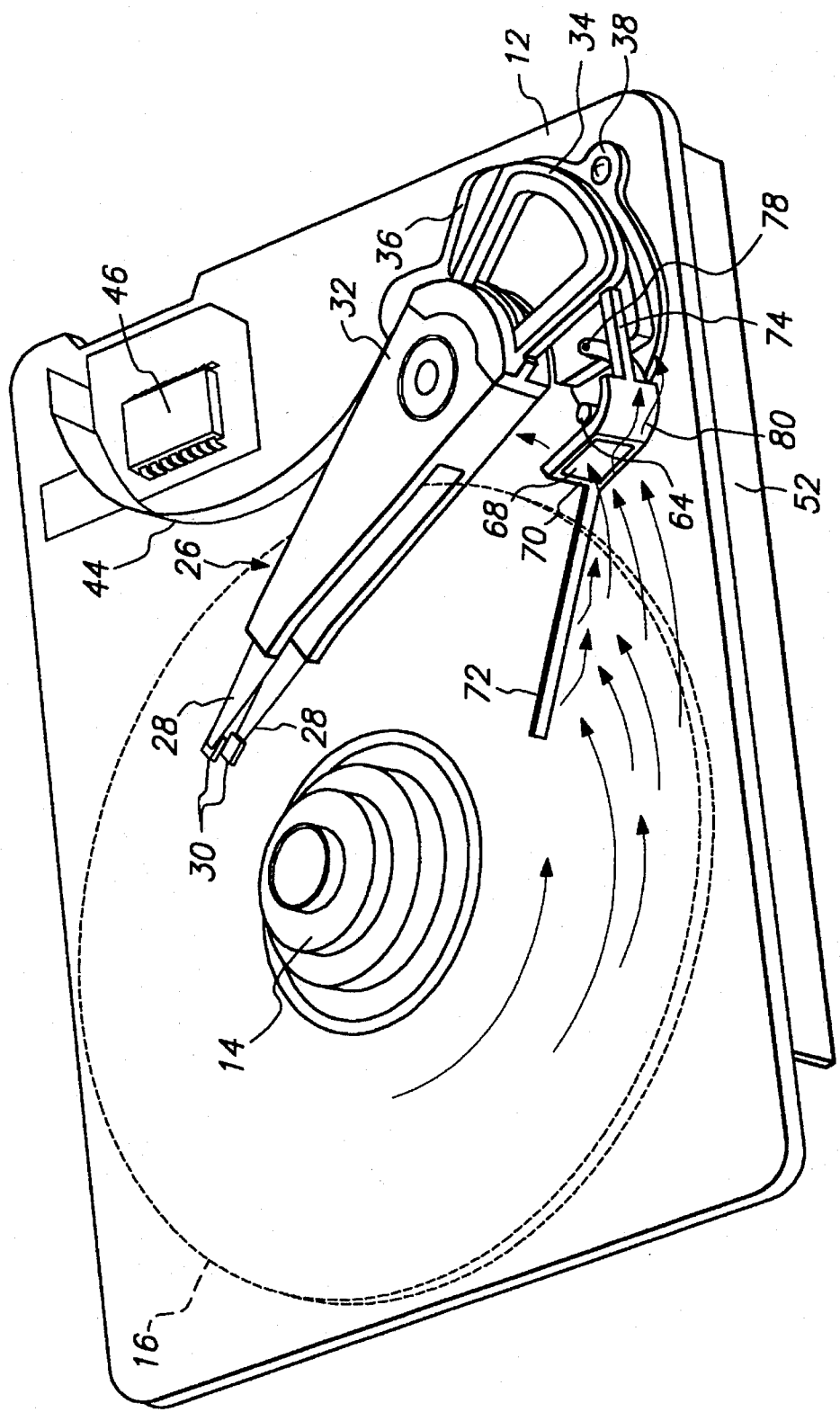
FIG. 6 is a highly diagrammatic isometric view of the FIG. 1 hard disk drive, showing airflow currents generated by rotation of the data storage disk (shown in FIG. 6 in dashed-line phantom outline).

Airflow generated within the hard disk drive 10 is illustrated in FIG. 6 in which arrows show components of airflow generated by rotation of the disk 16. Some of the airflow impinges upon and deflects the airvane portion 72. Most of this deflected airflow is thereby guided toward the central portion 70 and a major component of the airflow passes through the filter medium 68 which traps particulate contaminants otherwise available to cause damage at the disk head interface, or otherwise. Some small components slip around the curved segment 80, with relatively little, if any resultant counter-deflection force being realized at the actuator-filter latch body 66. During a disk drive power down sequence, as the disk 16 spins down, the electronic return spring moves the heads 16 to an inner landing zone position of the disk(s) 16 (shown in the FIG. 2 plan view). As airflow continues to lessen, the bias spring returns the latch to its latching position which engages a corresponding recess formed at the end of the molded actuator coil 36, and blocks rotational movement of the actuator 24 away from the landing zone in the absence of disk rotation.

While a specific example has been provided illustrating principles and uses of the present invention, those skilled in the art will appreciate that a number of variations and changes in materials and arrangements may be employed without departing from the spirit of the present invention. For example, the filter medium 68 is shown as a standard filter insert. A custom filter may be employed. While the filter medium 68 is shown disposed in a central portion of the actuator, it may be positioned at other locations, and in other configurations than as illustrated herein. Alternatively, the actuator-filter latch structure 66 may be constructed wholly or in part of a suitable micro-porous filter material, such as a porus plastic material of the type employed in so-called "felt-tip" pens. Such material is available under a number of brand names, one being provided by Porex Technologies of Fairburn, Ga.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. An enclosed head and disk assembly of a hard disk drive including a base and a cover, at least one rotating data storage disk journalled to the base, a rotary voice coil actuator rotatably attached to the base for positioning a data transducer head at data storage locations defined on major surfaces of the rotating disk, an aerodynamic actuator filter-latch including a shaft and a rotating latch structure on the shaft, the latch structure including an airvane portion extending across the disk adjacent one of the major surfaces thereof, at least one portion of the actuator filter-latch structure including an air filter for removing minute particulate contaminants from air within the enclosed head and disk assembly, an actuator latch portion extending toward the rotary voice coil actuator, such that rotation of the data storage disk causes the latch structure to rotate to an actuator release position and results in airflow through the air filter, and a curved counter-balancing segment extending from the shaft and curving towards the actuator latch portion, the aerodynamic actuator filter-latch including a curved arm portion encapsulating a means for biasing the latch structure toward an actuator latch position in the absence of airflow.

2. The disk drive set forth in claim 1 wherein the data storage disk comprises a 3.5 inch diameter data storage disk.

3. The disk drive set forth in claim 1 wherein the base essentially comprises a flat sheet metal plate, and wherein the cover comprises a formed sheet metal cover defining a space occupied by the enclosed head and disk assembly.

4. The disk drive set forth in claim 3 wherein the shaft extends upwardly from the base plate at a location spaced away from a periphery of the disk, and wherein the one portion including the air filter is located between the shaft and the periphery of the disk.

5. The disk drive set forth in claim 4 wherein the sheet metal cover is formed to concentrate airflow from the disk toward a central portion, thereby enhancing airflow impinging upon the central portion and passing through the air filter.

6. The disk drive set forth in claim 1 wherein the curved segment counterbalances the latch structure and restricts airflow around the latch structure.

7. The disk drive set forth in claim 1 wherein the rotary voice coil actuator includes a permanent magnet structure mounted to the base and defining a magnetic gap, and an actuator coil disposed in the magnetic gap, and wherein the means for biasing the latch structure includes a ferromagnetic body rotatably entering the magnetic gap and thereby biasing the latch structure toward the actuator latch position in the absence of airflow.

8. The disk drive set forth in claim 1 wherein the one portion including an air filter comprises a central portion wherein the air filter is located adjacent to a periphery of the disk.

9. An air filtration actuator latch structure for a hard disk drive enclosed head/disk mechanism including a base and a cover, at least one data storage disk rotationally mounted to the base, and an actuator mechanism movably mounted relative to the base for positioning a data transducer head at data storage locations on a surface of the rotating disk, comprising:

a shaft extending upwardly from the base having a central axis parallel with a spindle axis of the rotating data storage disk and being spaced away from a periphery of the disk by a predetermined distance, a rotatable actuator latch mechanism journalled at the shaft and including:
a central portion extending in a space from the shaft to adjacent the periphery of the disk, and including an open support frame,
an air filter occupying the open support frame,
an airvane portion extending from the central portion across a portion of the disk adjacent to a surface thereof,
an actuator latch portion extending from the central portion for releasably engaging the actuator at a latching position, a counter balancing curved segment located oppositely of the central portion and curving toward the actuator latch portion, the actuator latch mechanism further including a curved arm portion encapsulating a bias force-providing mechanism operative relative to the base for biasing the actuator latch mechanism to an actuator latch position in the absence of airflow from rotation of the disk, whereby rotation of the disk generates an airflow resulting in a deflecting force against the airvane portion and the central portion which overcomes the bias force and rotationally deflects the latch mechanism to an actuator release position while a component of the airflow passes through the air filter thereby filtering air within the enclosed head/disk mechanism.

10. The air filtration actuator latch structure set forth in claim 9 wherein the bias force-providing mechanism rotatably extends into a magnetic gap thereby to provide the bias force to urge the rotatable actuator latch mechanism toward the latch position in the absence of airflow from disk rotation.

11. The air filtration actuator latch structure set forth in claim 9 wherein the counter balancing curved segment counterbalances a latch body and restricts airflow around the latch body relative to an adjacent portion of the structure of the cover to guide airflow.

* * * * *